US006896609B2

(12) United States Patent
Lindsey et al.

(10) Patent No.: US 6,896,609 B2
(45) Date of Patent: May 24, 2005

(54) DRIVER/ENTRY VENTILATION SYSTEM FOR A BUS

(75) Inventors: Aaron D. Lindsey, Bryant, IN (US); Kenneth J. Smith, Yoder, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/624,666

(22) Filed: Jul. 22, 2003

(65) Prior Publication Data

US 2005/0048902 A1 Mar. 3, 2005

(51) Int. Cl.$^7$ .................................................. B60S 1/54

(52) U.S. Cl. ........................................ 454/93; 454/124

(58) Field of Search ............................ 454/85, 93, 121, 454/124, 127

(56) References Cited

U.S. PATENT DOCUMENTS

| | | | | | |
|---|---|---|---|---|---|
| 2,045,826 | A | * | 8/1936 | Benolken | 454/124 |
| 2,746,100 | A | * | 5/1956 | Nallinger | 454/123 |
| 4,783,115 | A | * | 11/1988 | Galubensky et al. | 296/208 |
| 4,888,959 | A | | 12/1989 | Brown | |
| 5,131,886 | A | * | 7/1992 | Haustein | 454/93 |
| 5,643,080 | A | * | 7/1997 | Kondoh et al. | 454/155 |
| 5,934,988 | A | * | 8/1999 | Fischer | 454/121 |

FOREIGN PATENT DOCUMENTS

JP    03121919 A  *  5/1991  ............ B60H 3/00

* cited by examiner

Primary Examiner—Harold Joyce
(74) Attorney, Agent, or Firm—Jeffrey P. Calfa; Dennis Kelly Sullivan; Susan L. Lukasik

(57) ABSTRACT

Heating, ventilation and air conditioning systems for busses having air distribution at the front of the bus through a distribution system integrated with the dashboard and outlet vents shaped and oriented to provide clearing of mist and frost from vehicle windows, particularly those in and around an entry to the vehicle. A dedicated blower for an entry way door is provided.

7 Claims, 5 Drawing Sheets

DRIVER/ENTRY VENTILATION SYSTEM FOR A BUS

BACKGROUND OF THE INVENTION

1. Field of the Invention

The present invention relates to ventilation systems for busses, and, more particularly, to a dash integrated duct system for delivering heated and air conditioned air to the driver and entry areas of a school bus.

2. Description of the Problem

School busses have often been equipped with primitive heating, ventilation and air conditioning systems, sometimes added to the vehicle as an after market accessory. After market systems are often free air systems and can produce highly uneven temperatures through the vehicle's passenger compartment and may be of limited effectiveness at defogging and defrosting either the vehicle's windshield or the windows surrounding and in the entry door to the vehicle located opposite the driver's station at the front of the bus. Legal requirements exist relating to keeping windows in the entry area and well clear of frost and fog.

SUMMARY OF THE INVENTION

According to the invention there is provided an air distribution system for a bus having a dashboard positioned at the front of an interior of the bus and running from side to side of the bus. An entry is provided at the front end and to one side of the bus with an entry well being located adjacent the entry below the floor level of the interior of the bus. A plurality of windows are collocated with and near the entry door to help a driver controlling the entry door in seeing people, particularly children, outside of the vehicle and near the door. A vertically elongated slit outlet, or multiple, smaller outlets vertically aligned on one another, from the dashboard are oriented toward the entry well adjacent the door to direct forced air against a plurality of the windows associated with the entry. A first blower provides for dash defrost and driver station air outlets and a second blower is provided for the entry way outlets. A further plurality of outlet ducts coupled to receive air from the air treatment unit and located under a vehicle windshield are oriented to direct treated air against the vehicle windshield. Outlet ducts from the dashboard near a steering wheel are oriented to direct air from behind the steering wheel toward the driver. Outlets are also directed from the dash toward driver side windows.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
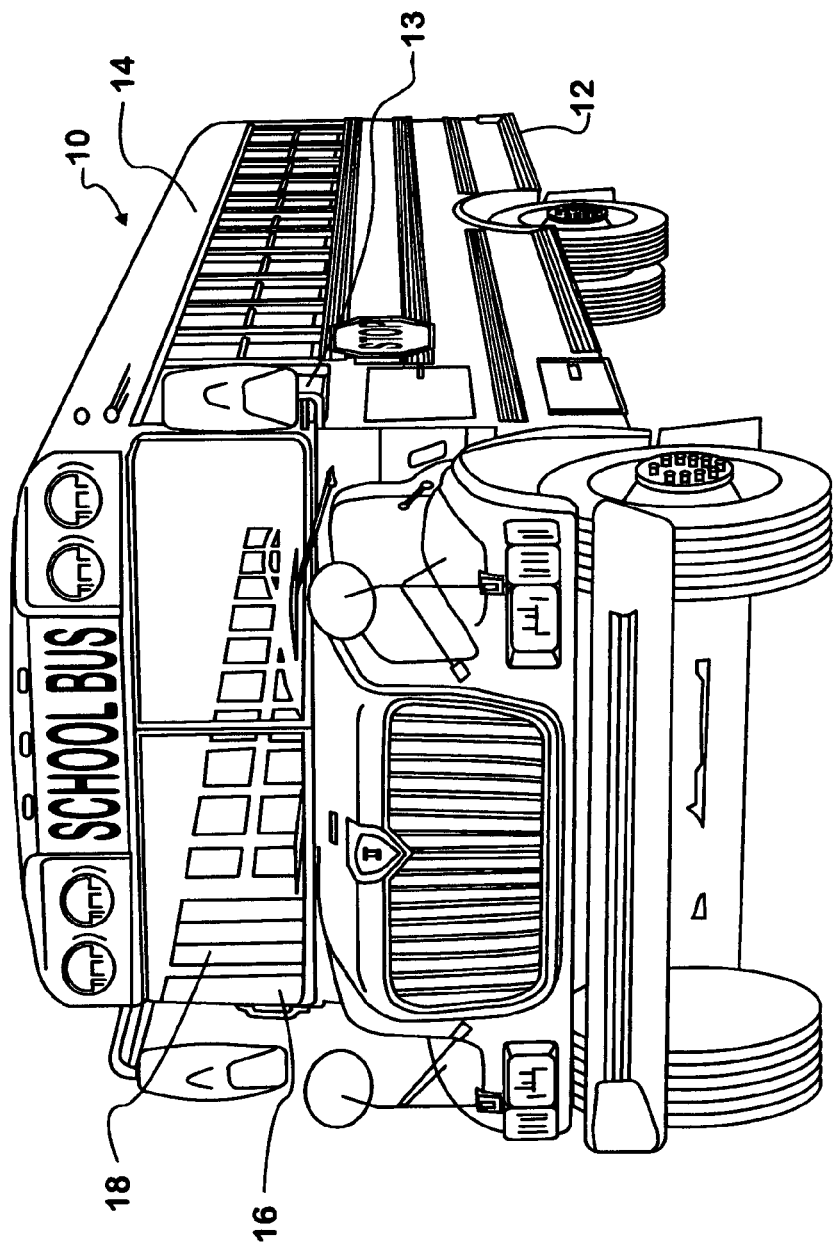
FIG. 1 is a perspective view of a school bus of a type with which the invention is advantageously employed.

Referring now to the figures, FIG. 1 shows a school bus 10 having an elongated body 12 enclosing a passenger compartment. Bus 10 has a driver's side 14 and an entry side 16, on which passengers can embark on and disembark from the bus. A number of entry area windows 18 are located adjacent to and in a door on the entry side 16. Driver side windows 13 are located toward the front of elongated body 12 along the driver's side 14.

Figure 2:
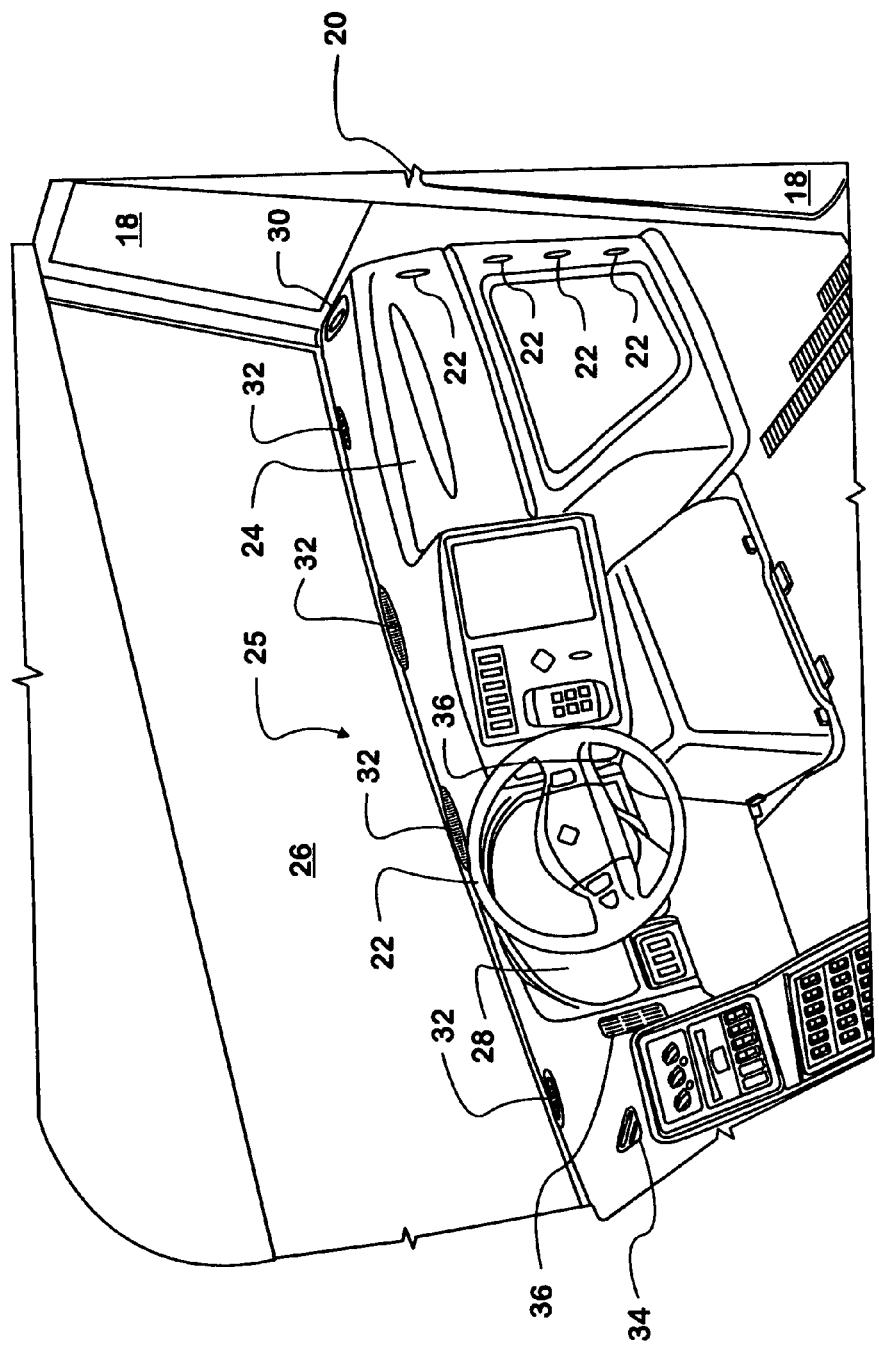
FIG. 2 is a perspective view of a driver's station and entry from the interior of the bus of FIG. 1.

Referring now to FIG. 2, a passenger entry way or door 20 has a plurality of entry way windows 18 through which a vehicle operator seated behind steering wheel 22 may observe events outside the vehicle adjacent the forward portion of bus 10 and along the entry side 16. The ventilation system of the present invention distributes air to entry way windows 18 to clear the windows of fog and frost. A plurality of vertically aligned outlet ducts 22 are provided through entry side section 24 of dashboard 25 to distribute air across entry way windows 18 set in door 20 including downwardly into a well 17 adjacent the bottom end of door 20. A side outlet 30 from entry side section 24 directs air forced from the ventilation system upwardly against an entry way window 18 located forward from door 20. Well 17 can, due to frequent boardings during cool, wet mornings, become a repository of moisture contributing to fogging of windows 18.

Dashboard 25 extends from side to side across the front end of an enclosed passenger compartment for bus 10 under a windshield 26. Various additional outlet ducts are incorporated into the dashboard 25 to provide air to the driver and air flow to the windows located in the front portion of the vehicle. Among the outlet ducts are a series of defrosting ducts 32 located under windshield 26 along the edge of dashboard 25 adjacent the bottom of the windshield. A side outlet duct 34 is positioned along the driver's side 14 of bus 10 for clearing windows on that side. Outlet ducts 36 from the dashboard 25 on either side of steering wheel 22 provide heating and possibly cooling air to a driver seated behind the wheel. All of the outlet ducts are molded into dashboard 25 and align with ductwork behind the dashboard and to direct air as required by the particular layout of the windows of a given vehicle.

Figure 3:
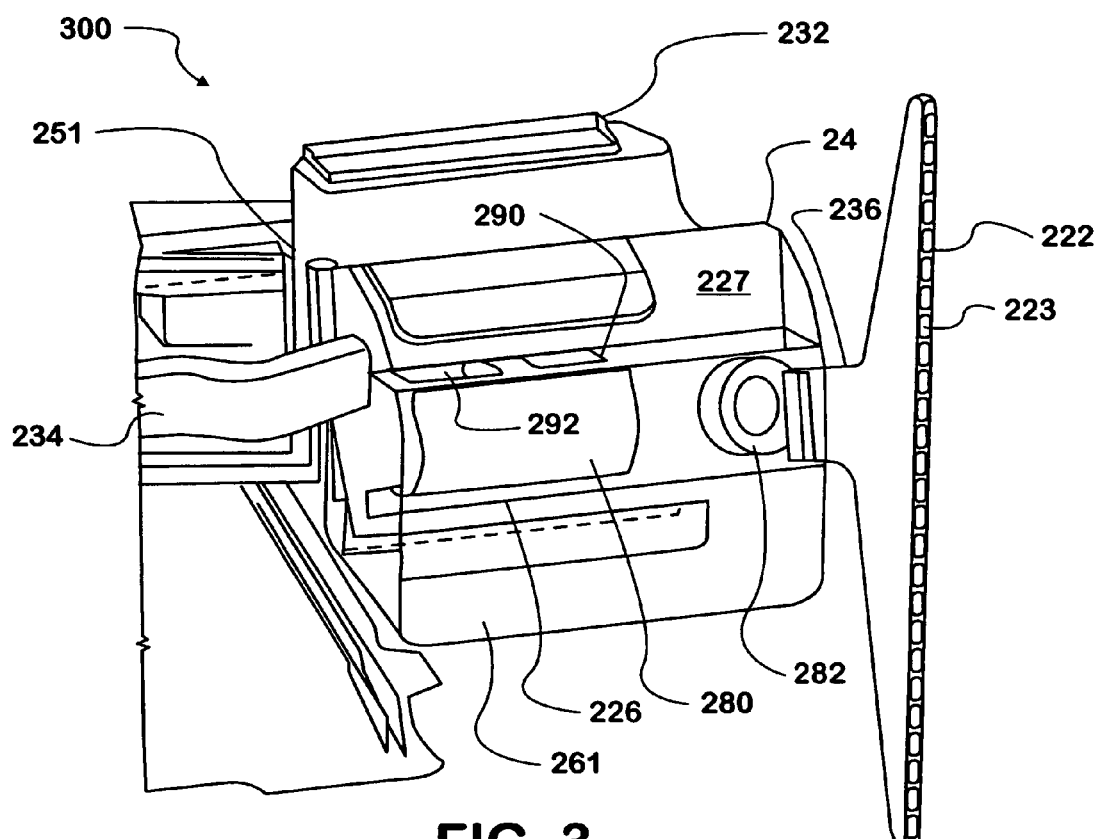
FIG. 3 is a perspective view of the ventilation system as adapted for use along the entry side of the vehicle.

Referring to FIG. 3, an HVAC unit 226 of a ventilation system 300 is illustrated. HVAC unit 226 draws air through a fresh air intake 232 located forward of the vehicle cowl and into a heater/evaporator coil plenum 261. Above plenum 261 are two blowers, a dash blower 280 and a dedicated entry way blower 282 drawing treated air through the plenum. Both blowers are situated within entry side dashboard 24. Entry way blower 282 has attached at one end thereof a turned duct 236 which spreads into a vertically elongated entry way fan vent 222. Fan vent 222 provides an vertically elongated, narrow air outlet 223 directed rearwardly into the passenger compartment of the vehicle. Entry way fan vent 222 fits butted against the back major face of the entry side dash board 24, aligned with the plurality of entry way outlet vents 32, which provide direction and widespread distribution for air flowing from outlet 223 toward the windows of the bus's entry way area.

Dash blower 280 forces air upwardly through openings 290 and 292 into a central distribution plenum 227. Located toward the driver's side of the vehicle from plenum 227 is a distribution duct 234 which transports air to a plurality of outlet ducts oriented to provide air to a driver. Mode door 251 is located below intake 232 behind plenum 261 and is used to direct air to other defrost/defog vents.

Figure 4:
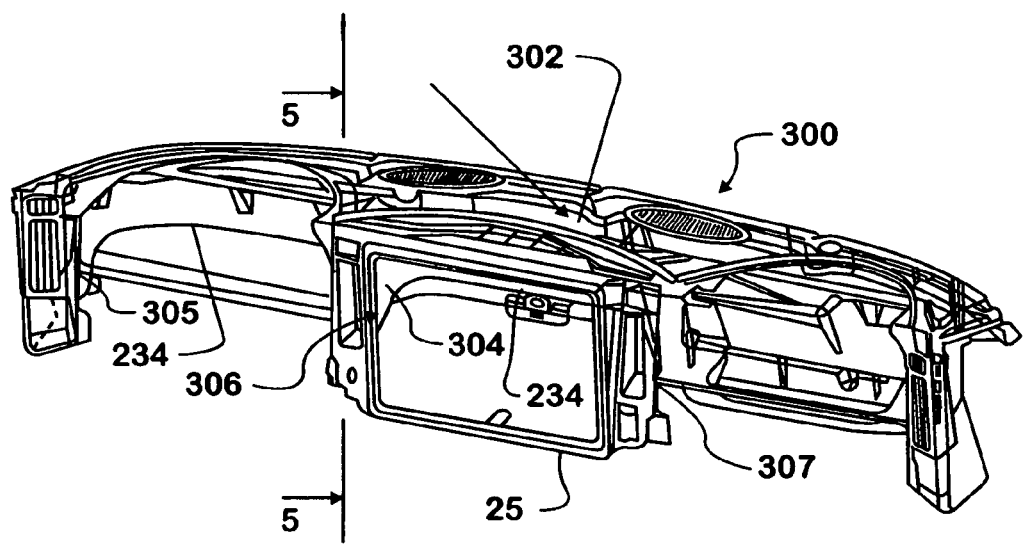
FIG. 4 is a perspective view of the ventilation system as it fits in a dash with an alternative outlet for the entry side.

In FIG. 4 a driver's side of the ventilation system 300 is illustrated including the main distribution duct 234 located within dashboard 25. Extending back from distribution duct 234 to the passenger compartment face of dashboard 25 are a plurality of subsidiary ducts 304, 305 and 307, each of which have outlets oriented into the passenger compartment and which are associated with, and aligned on, ducts from the panel into the passenger compartment. Parallel to and located above main distribution duct 260 is a defrost distribution duct 302 from the central plenum 227 which lies just under the upper surface of dashboard 25. Ventilation system 300 is integrated into dashboard 25.

Figure 5:
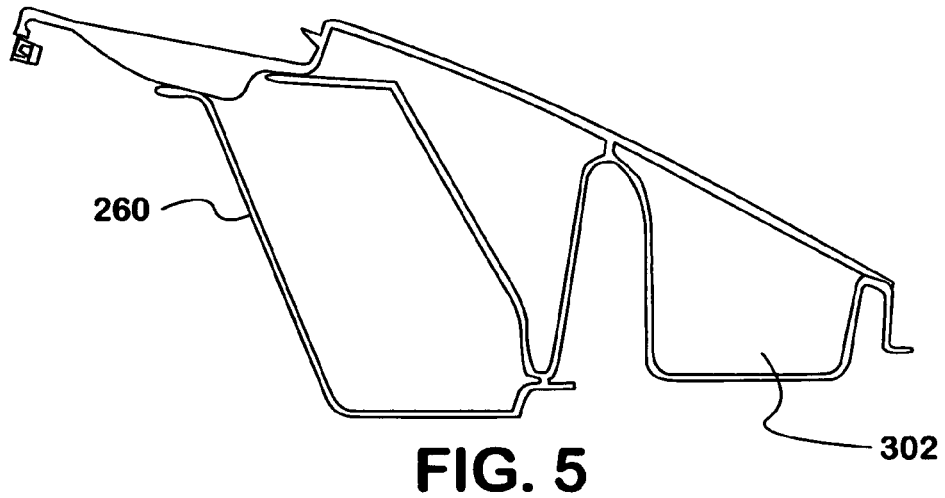
FIG. 5 is a cross-sectional view of a portion of the ventilation system.

Referring now to FIG. 5, which is a cross sectional view of ventilation system 300 taken along section lines 5—5 of FIG. 5, the relative positions of main distribution duct 260 and defrost distribution duct 302 are illustrated. Defrost distribution duct 302 communicates with a plurality of outlet ducts 32 located along the top of dashboard 25.

Figure 6:
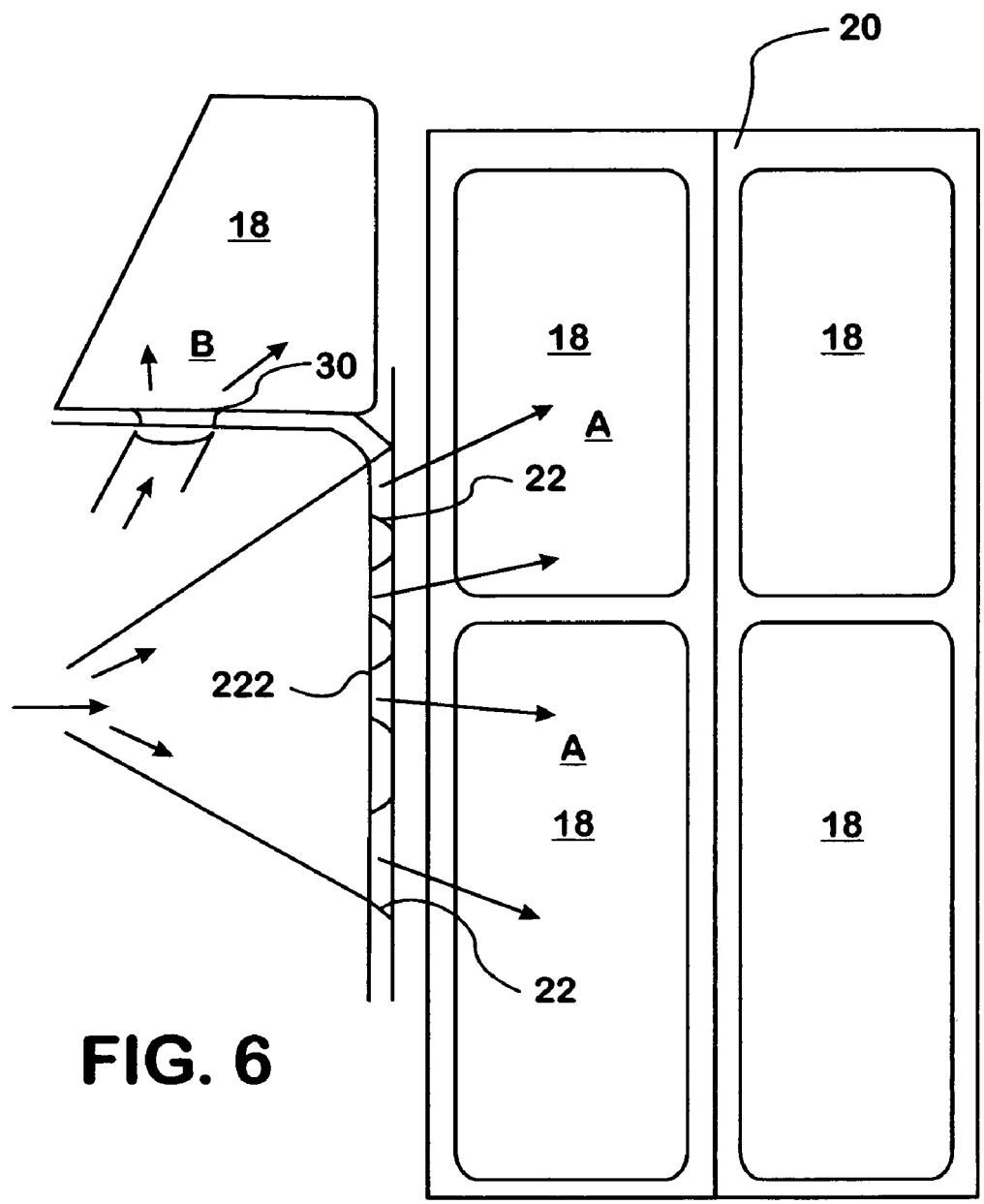
FIG. 6 is an elevation showing air distribution patterns across an entry way door.

FIG. 6 illustrates the distribution patterns A and B from outlet ducts 22 and 30, respectively, illustrating the forced diffusion of air from the ducts toward the interior surfaces of entry way windows 18 in door 20 and above dashboard 25 forward from the door. Forced heated or cooled area should reach substantially all of the surface area of windows 18 facing the vehicle's interior to clear mist or frost from the windows. Pattern A is a narrow, vertically elongated fan of air, angled by ducts 22 to intersect the windows 18 mounted in door 20 substantially across the breadth of the windows. Duct 30 is similarly outwardly canted to direct air flow on a path intersecting windows 18 forward from door 20.

The invention provides an effective, dashboard integrated ventilation system which accommodates the need on school busses to provide fog and frost removal from entry way area windows.

While the invention is shown in only one of its forms, it is not thus limited but is susceptible to various changes and modifications without departing from the spirit and scope of the invention.

What is claimed is:

1. A ventilation system for incorporation into the dashboard of a vehicle, the vehicle having a door to a side entry with an entry well adjacent the door and inside the vehicle, the ventilation system comprising:
    an air treatment unit;
    an entry way outlet duct arrangement vertically arrayed on the dashboard along one side of the door, coupled to receive air from the air treatment unit with the entry way outlet duct being oriented toward the entry well adjacent the door to direct air from the air treatment unit against a broad portion of the door from the side of the door for a substantial portion of the vertical height of the door;
    a plurality of outlet ducts coupled to receive air from the air treatment unit and located and oriented under a vehicle windshield to direct forced air against the vehicle windshield; and
    an outlet duct from the dashboard near a steering wheel oriented to direct forced air behind the steering wheel.

2. A ventilation system as set forth in claim 1, further comprising first and second blowers in the air treatment unit, the first blower being connected to deliver treated air to the entry way outlet duct arrangement.

3. A ventilation system as set forth in claim 2, wherein the entry way outlet duct arrangement includes a fan vent oriented to direct air rearwardly from the dashboard and a plurality of vertically arrayed slit outlets from the fan vent.

4. A ventilation system as set forth in claim 3, further comprising an outlet duct from the vehicle dashboard directing air against driver's side windows of the vehicle.

5. A motor vehicle comprising:
    an elongated body defining an interior;
    an air treatment unit;
    a dashboard positioned at the front of an interior to the elongated body running from side to side thereof;
    an entry at the front end of and to one side of the elongated body;
    a floor further defining the interior;
    a well extending below the level of the floor of the interior of the elongated body and located adjacent the entry, the dashboard including an entry side section along the well;
    a door in the entry extending upwardly from the base of the well;
    a plurality of windows associated with the entry and the door including windows in the door extending from substantially adjacent the bottom of the door to substantially near the top of the door;
    a windshield;
    driver's side windows opposite the entry;
    a vertically elongated outlet from the dashboard and entry side section oriented toward the entry well adjacent the door to direct forced air against a plurality of the windows associated with the entry including windows associated with the door beginning in from a point below the floor level of the bus passenger compartment and extending upwardly for a substantial portion of the vertical extent of the entry;
    a plurality of outlet ducts from the dashboard, located under a vehicle windshield and oriented to direct forced air against the vehicle windshield;
    an outlet duct from the dashboard near a steering wheel oriented to direct forced air behind the steering wheel; and
    the air treatment unit being coupled to supply forced air to selected ones of the outlet duct, the vertically elongated outlet and the plurality of outlet ducts from the dashboard.

6. A motor vehicle as set forth in claim 5, further comprising:
    a duct system incorporated into the dashboard coupling the outlet ducts for the windshield and near the steering wheel to a first source of treated, forced air.

7. A motor vehicle as set forth in claim 6, further comprising a second source of treated forced air coupled to the vertically elongated outlet.

* * * * *